United States Patent [19]
Mathews

[11] Patent Number: 6,041,303
[45] Date of Patent: Mar. 21, 2000

[54] METHOD OF ASSISTING THE CONDUCTING OF A RESEARCH PROJECT

[76] Inventor: Edward Henry Mathews, 29 Nicklaus Street, Silver Lakes, Pretoria, South Africa

[21] Appl. No.: 08/870,481

[22] Filed: Jun. 6, 1997

[30] Foreign Application Priority Data

Jun. 7, 1996 [ZA] South Africa ............................ 96/4864
[51] Int. Cl.[7] ............................. G06F 17/30; G06F 17/21
[52] U.S. Cl. ................................ 705/1; 707/531; 707/514
[58] Field of Search ................................ 705/1; 707/530, 707/531, 505, 506, 514, 515; 706/927

[56] References Cited

U.S. PATENT DOCUMENTS

| | | | |
|---|---|---|---|
| 4,992,939 | 2/1991 | Tyler | 704/9 |
| 5,148,366 | 9/1992 | Buchanan et al. | 707/531 |
| 5,168,548 | 12/1992 | Kaufman et al. | 704/200 |
| 5,191,522 | 3/1993 | Bosco et al. | 705/4 |
| 5,212,639 | 5/1993 | Sampson et al. | 705/30 |
| 5,267,155 | 11/1993 | Buchanan et al. | 707/540 |
| 5,272,623 | 12/1993 | Grubb et al. | 395/701 |
| 5,423,033 | 6/1995 | Yuen | 707/4 |
| 5,465,378 | 11/1995 | Duensing et al. | 707/529 |
| 5,493,490 | 2/1996 | Johnson | 705/26 |
| 5,544,352 | 8/1996 | Egger | 707/5 |
| 5,553,278 | 9/1996 | Suzuki et al. | 707/2 |
| 5,615,342 | 3/1997 | Johson | 705/27 |
| 5,625,776 | 4/1997 | Johnson | 705/27 |
| 5,675,820 | 10/1997 | Jurovics et al. | 707/531 |
| 5,692,206 | 11/1997 | Shirley et al. | 707/531 |
| 5,794,236 | 8/1998 | Mehrle | 707/5 |
| 5,802,493 | 9/1998 | Sheflott et al. | 705/1 |
| 5,832,532 | 11/1998 | Kennedy et al. | 707/503 |
| 5,845,304 | 12/1998 | Iijima | 707/530 |
| 5,924,108 | 7/1999 | Fein et al. | 707/531 |
| 5,937,155 | 8/1999 | Kennedy et al. | 707/505 |

OTHER PUBLICATIONS

Bjorner, Susanne. "Bibliography formatting software for managing search results: EndNote Plus and EndLink." Online, vol. 19, No. 5, p. 38–, Sep. 19, 1995 [retrieved from DIALOG file 47].

"New Products 2, Desktop Computing." Computerworld, p. 56–, Nov. 6, 1995 [retrieved from DIALOG, file 674].

Berst, Jesse. "Smart Web strategies for a turbulent market." PC Week, vol. 12, No. 19, p. 105, May 15, 1995 [retrieved from DIALOG file 275].

Cohen, Raines. "MarcoPolo puts squeeze on data; Mainstay program indexes files." MacWeek, vol. 4, No. 12, p. 6, Mar. 27, 1990 [retrieved from DIALOG file 275].

Amulet Product announcement, "Amulet Debuts New Information Agents; Company Plans early 1997 Launch of Internet–Based Automated Research Service," New Product Announcements, Dialogue Database, Oct. 1996.

*Primary Examiner*—Allen R. MacDonald
*Assistant Examiner*—Michele Stuckey Crecca
*Attorney, Agent, or Firm*—Lahive & Cockfield, LLP

[57] ABSTRACT

A method of assisting the carrying out of a research process is implemented with the aid of specialized computer software. The software defines a sequence of predetermined research process steps. In a first step, predetermined prompts are generated which guide the researcher to enter data corresponding to the results of a literature survey, to set up a database which is used by subsequent steps. In a second step, prompts are generated to guide the researcher to enter proposal data, and selected data is retrieved from the database to include in a written proposal to a sponsor. The proposal data and the selected reference data from the first database are combined in a second database, which is used as the basis for the next step in the process. In the next step, the software generates prompts to assist the researcher in entering research results which are also stored in the second database in a predetermined format. The contents of the altered second database are then used to generate a research report in a partially predetermined format, as well as articles or papers, and presentations. The invention streamlines the research process and is particularly advantageous in assisting inexperienced researchers to follow the corrected procedure.

22 Claims, 10 Drawing Sheets

METHOD OF ASSISTING THE CONDUCTING OF A RESEARCH PROJECT

BACKGROUND OF THE INVENTION

THIS invention relates to a method of assisting, the conducting of a research project. It relates in particular, but not exclusively, to a method of assisting a researcher to assemble data on a selected research project and to utilise the data efficiently. It also relates to a computer system including software for implementing the process.

New researchers, such as students, often conduct research inefficiently because they have not yet mastered all the elements of the research process. Experienced researchers such as consultants, scientists, engineers and the like are also inefficient as the elements of their research are often not properly addressed and/or integrated with one another.

It is an object of the invention to facilitate the conducting and organisation and streamlining of the elements in a research project.

SUMMARY OF THE INVENTION

According to the invention there is provided a method of assisting the conducting of a research process which comprises a plurality of steps, the method comprising;

defining a sequence of predetermined research process steps to be used by a researcher;

in a first step, generating predetermined first prompts to guide the researcher to enter reference data corresponding to the first prompts;

storing the entered reference data in a first database having a structure which is at least partially predetermined;

in a second step, generating second prompts to guide the researcher to enter proposal data corresponding to the second prompts;

automatically retrieving selected reference data from the first database, at least partially according to predetermined requirements of the second step;

storing the selected reference data and the proposal data in a second database for use in at least one further step of the method; and generating a first report including at least a portion of the selected reference data and the proposal data.

Preferably, the first database stores the entered reference data in a hierarchical tree structure.

The first report which is generated, including at least a portion of the selected reference data and the proposal data, may be compiled as a project proposal for presentation to a sponsor.

Preferably, the second prompts guide the researcher to enter work plan data corresponding to the second prompts, the work plan data being stored in the second database.

The entered work plan data preferably defines the structure of the second database at least partially.

The method may include, in a third step, generating third prompts to guide the researcher to enter result data corresponding to the third prompts and storing the entered result data in the second database together with data stored previously in the second database.

The method may include, in a fourth step, generating fourth prompts to guide the researcher to select and/or enter report data corresponding to the fourth prompts for inclusion in a research report.

Preferably, the method further includes generating a research report comprising report data and data selected from the second database, the research report being compiled in a format which is at least partially predetermined by the structure of the second database.

The method may also include generating an abbreviated article and/or conference paper and/or a presentation from data selected from the second database.

Referring to FIG. 1, which shows a typical research process followed by researchers, the conducting of a typical research project usually starts with a literature survey 10. Here the researcher establishes the "state-of-the-art" in his/her research field. Based on this information, the researcher can then determine the "need" for his/her research ideas or concepts 12. This information, together with the accompanying references, is needed to successfully complete the next steps in the research process. The term "reference" indicates an exact description of the source of the information. In other words, someone else should be able to locate the same piece of information from the reference given.

However, the literature survey and reference information is often difficult to capture electronically. Furthermore, it is often stored in a haphazard fashion and cannot be easily accessed when needed. Even if the researcher makes use of conventional database software, the information is usually still stored in an inflexible sequential format, which is troublesome to organise.

The invention now provides a direct link between the researcher's literature database and the Internet. Text may also be automatically captured from files obtained through CD-ROM databases and other data stored electronically. The invention makes the capturing and organising of literature information and accompanying references an easy task.

To assist the researcher, the invention prompts and helps the researcher to formulate a detailed and well-structured research work plan 14.2. The researcher is also prompted to bear the importance of good planning in mind, as the invention uses the work plan to form the foundation of all the research steps still to follow.

Both the proposal 14.1 and work plan 14.2 may then be generated in a neat and professional proposal document using the new invention. If changes to the proposal document are required, it is easy to implement the changes using the invention and to then regenerate the document. In such a way, the document may be iterated until the researcher and/or sponsor is satisfied.

The invention includes a facility for generating an executive summary of the proposal. The executive summary summarises the proposal by including selected details from the proposal document.

Typically, the step of generating the executive summary includes retrieving details associated with preselected prompts from the proposal file and combining them to form an executive summary document. Thus when generating the executive summary document, it is not necessary to re-enter the information. The executive summary document may then be edited by means of a conventional word processing package.

When the proposal and work plan have been authorised or approved by the sponsor, the actual research work 16 must be conducted. This might entail the acquisition of further literature information, drawing up of questionnaires, conducting simulations, conducting measurements, processing and interpreting of results and the like.

The invention uses a convenient and logical tree structure to organise the data from the literature survey in a first database. This tree structure is created by the researcher and may be edited easily. It is also easier to obtain a complete overall view of the stored information than when using a sequential database. The tree structure also allows the researcher to capture data directly to a specific relevant heading.

Once the literature survey is completed and the project idea 12 is established, the researcher will have to "sell" his/her idea to a sponsor. In the context of the present invention, a sponsor can include, for example, a funding agency as well as a student's supervisor. This is done through a well-written research or study proposal 14.1 dealing with all the questions the sponsor may have. Many researchers find this important step of the research process difficult.

The invention addresses this problem by prompting and assisting the researcher to provide all the necessary information. Using the invention, a researcher is able to enter information and/or to access the information requested by each prompt automatically from his/her literature and reference database and/or address database (these databases being created using the invention) in response to one or more of these prompts. This integration between the invention's literature and reference database and/or address database and the proposal makes the research process more efficient.

The sponsor will further wish to see if the researcher is able to conduct the work in the most efficient manner possible. Unfortunately, researchers often do not realise the importance of thorough planning.

When the time comes for this information to be stored, researchers again encounter problems as their methods for storing their "work" information are often inefficient. If all of the researcher's work information is inefficiently stored, they will again experience problems when trying to actually retrieve the information for use in the research document.

The invention now provides the researcher with an electronic storage cabinet (also referred to herein as the "work database" or second database), which stores information in a logical and flexible tree structure of headings. This allows the information to be easily stored, organised and retrieved.

A very important aspect of the invention is that the tree structure of the work database can be taken directly from the work plan 14.1 completed at stage 14 of the research process. This makes the rest of the steps in the research process more efficient and also ensures that the researcher obtains all the information and does all the work considered pertinent by the sponsor.

Once the researcher has completed the actual research work and stored all of the work information in the invention's work database, he/she will next have to write a final research document (e.g. report, dissertation or thesis 18 and/or article or paper 20) describing the work he/she has just completed. For many researchers, this is a daunting task. The information required for the research document is often not stored in a logical manner and can thus not be accessed easily.

However, with the use of the invention, all the information on the researcher's work is safely and logically stored in the structured work database. Another important element of the invention is that the work database tree headings can be used as the chapter headings of the research document 18 and/or 20. This greatly improves the researcher's efficiency. The research process is even farther enhanced as the invention also allows the stored information to be included in the body of the research document.

The invention then automatically creates a neat first iteration of the researcher's document by inserting the chapter headings and stored information into a conventional word processor. Although the researcher will still need to edit the generated research document, the invention saves the researcher a considerable amount of time. Once any information is stored in any step of the research process using the invention, it can easily be accessed for immediate and automatic retrieval into any of the elements of the invention.

At some later stage, the researcher may wish to give a presentation 22 on his/her research. This is particularly relevant when giving feedback on the progress of a research project or delivering a conference paper. Often researchers spend a great deal of time and effort on this as they do not directly integrate the information contained in the final research document 18 and/or 20 with the information required for their presentation 22.

The invention helps the researcher to quickly produce a slide presentation by automatically retrieving specific information from the research document. The presentation slides, transparencies or the like may then be generated and edited using conventional presentation software.

The invention also consists of two additional elements which further assist the researcher to be more efficient. The first is a direct link to relevant Internet web-sites, search sites and mailing lists that may be of interest to the researcher. Using the invention, information from these Internet sites can be directly copied and stored in the researcher's literature database or work database for further use in other elements in the research process (for example the report, article or the like).

The second additional element of the invention is a convenient address database. All the necessary contact details for specialists, referees, suppliers, potential sponsors and the like may be accessed from this database for use in a word processor document or any other of the invention's components. A novel feature is that people's details are not only listed alphabetically, but also according to their fields of expertise

DESCRIPTION OF AN EMBODIMENT

Figure 1:
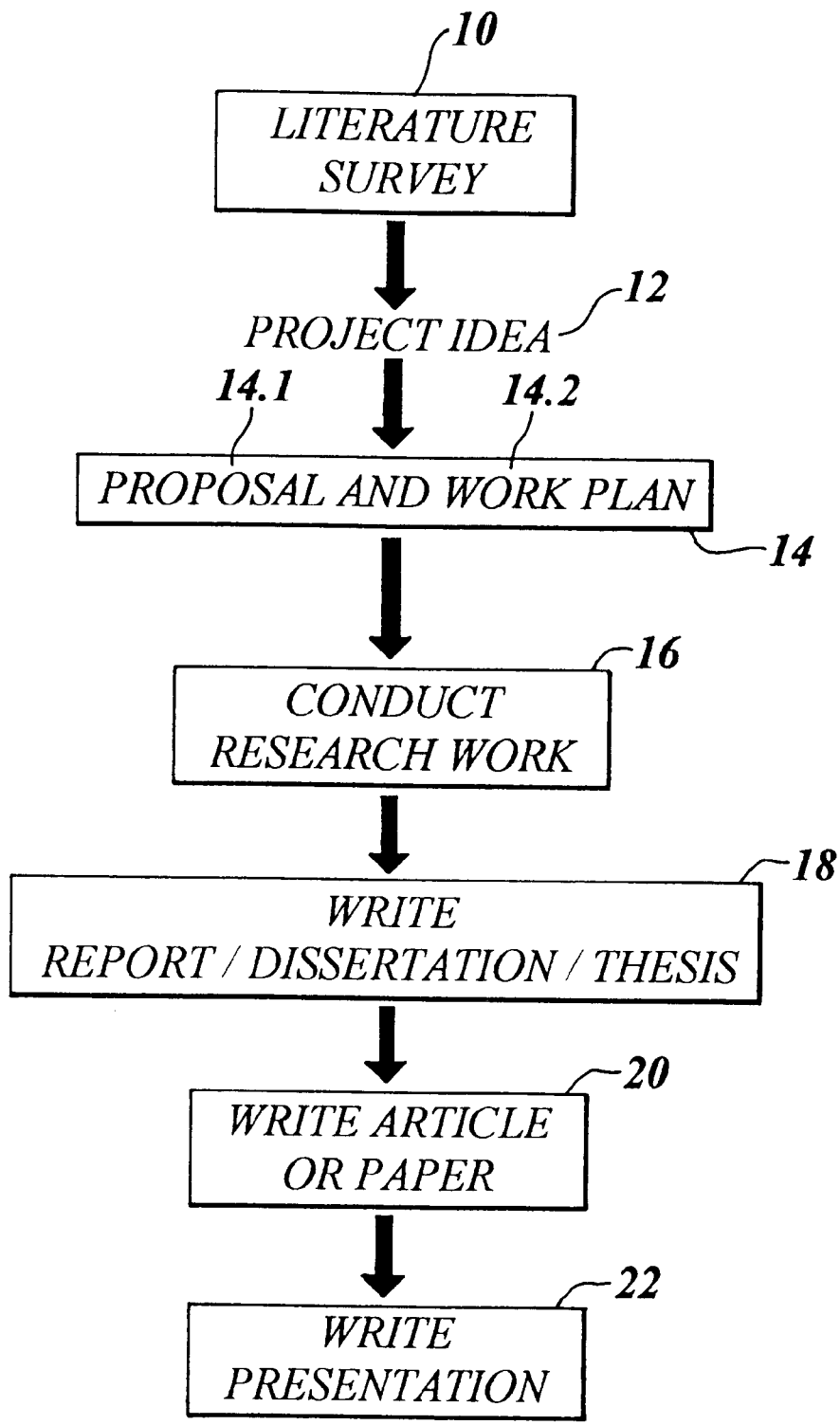
FIG. 1 shows the research process usually followed by researchers conducting a research project.

The invention is typically implemented in a suite of computer programs as well as an on-line help system which may be stored, for example, on a personal computer or a computer network. A user manual and/or research handbook are also provided which explain how the invention enhances the research process. The invention will typically include enhancement of the researcher's word processor (for example menu items, macros and the like) to aid the researcher when generating and editing research documents.

The description below deals first with the user interface of the invention, following which a technical description of the software used to implement the invention is provided.

Typically, the research process (enhanced by the method of the invention) commences with a literature survey 30 to elicit information 32 from various sources. This may be from books, journals, CD-ROM databases, the Internet and the like. The invention provides a facility whereby information 32 from Internet web-sites, search sites and mailing lists as well as CD-ROM databases and the like can be directly copied and stored in the researcher's literature and reference database 34. This facility can be accessed from within the invention's literature and reference database 34, from the word processor or from the researcher's Internet browser.

It is important for the researcher when collecting information 32.1 to include comprehensive references 32.2 so that the source 30 may be relocated with relative ease at a later date. Each item of information 32.1 is thus usually stored with its own reference 32.2 in the literature and reference database 34.

The software of the invention prompts the researcher to enter and organise the information 32 under headings and sub-headings (and further headings under these sub-headings and so on if applicable) in a tree structure that is created by the researcher.

The researcher can add, edit or delete these headings as the literature study progresses and the tree structure is formed. Now, all the information 32 from the researcher's literature study (which will be used for later steps in the research process) is entered into the literature and reference database 34 tree structure.

The information 32 stored in the literature and reference database 34 can be in the form of abstracts or excerpts, normal text, text with symbols, pictures, tables, full documents, graphs, equations, spreadsheets and complex tables, OLE objects, stand-alone references, information without a reference and the like. The researcher's interpretations on the information 32 as well as the researcher's comments may also be added to this information.

It is also easy to obtain a complete overall view of the statistics of the information stored in the invention's literature database 34. These statistics may include the number of headings, pieces of information, references and authors as well as a complete breakdown of all the types of information (as previously listed) that are currently stored in the database 34.

As data is entered into the literature database 34, the software prompts the researcher to provide detailed reference information on the literature by prompts requesting, for example, the type of source 30 (e.g. book, paper, report, article, thesis, Internet, etc.), titles, name and title of author (which may be extracted from the researcher's previously compiled address database 36), dates of publication, volume numbers and so on. This reference information is stored in the literature database 34 so that the source of the information included in the literature database 34 may easily be traced.

The prompts requesting referencing information are not fixed and can be adapted or deleted by the researcher. The researcher is also free to create his/her own prompts requesting referencing information.

The idea or concept for the research project 38 then often originates from browsing through the information stored in the literature database 34. Once a viable project idea 38 has been formed and motivated from the latest literature information 32 contained in the literature and reference database 34, the researcher then presents or "sells" his/her idea to a potential sponsor, study leader or the like, to ascertain whether or not it is viable to carry out the project and/or ascertain whether or not the potential sponsors will be willing to finance and/or support the project. This is done through a well-written proposal document 24.

Figure 2:
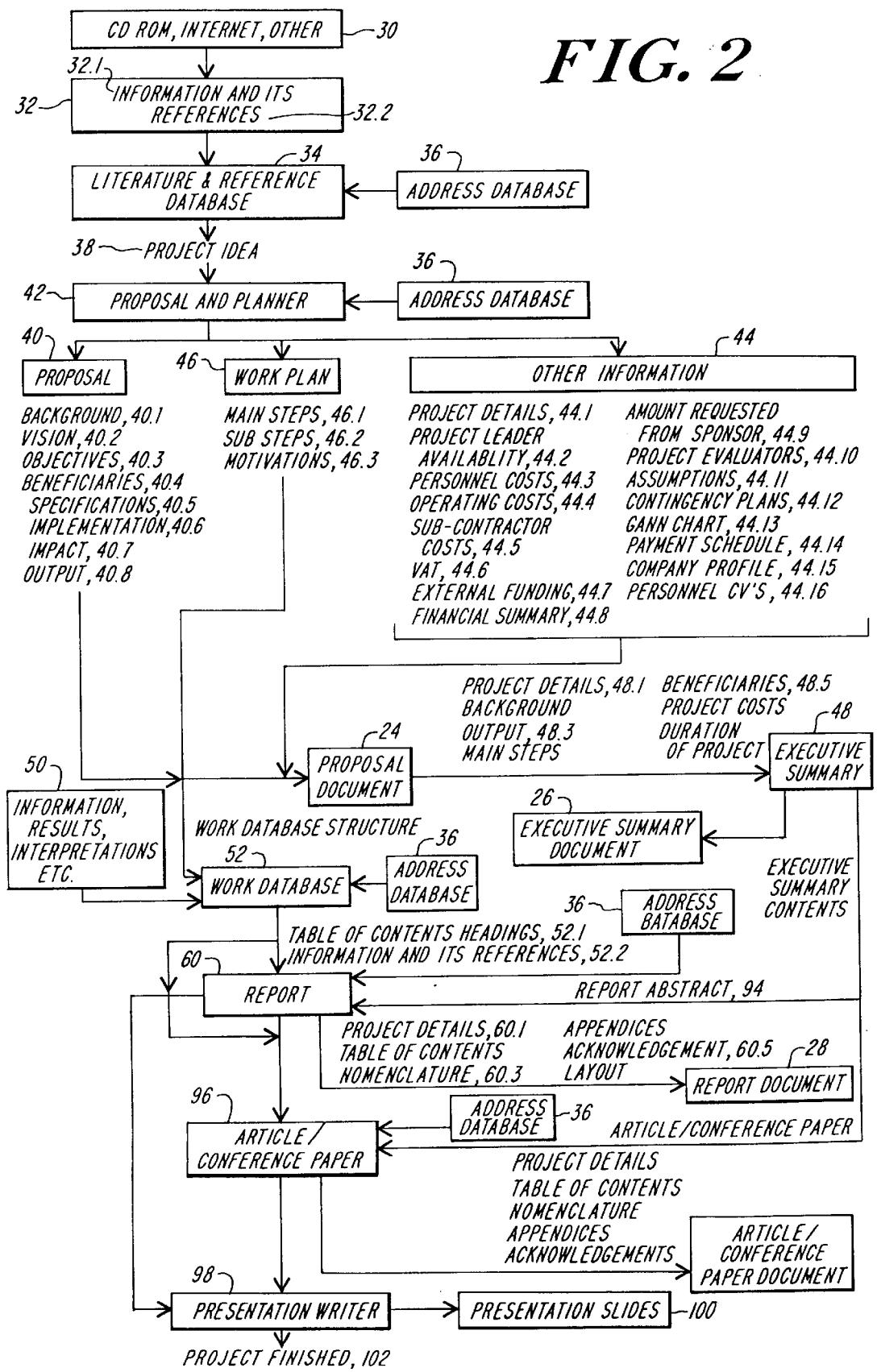
FIG. 2 is a schematic flow chart of an enhanced method of assembling, sharing and manipulation of data in accordance with the invention.

To aid the researcher in compiling this document, the researcher is provided by the software with a plurality of primary prompts 40, 44 and 46 (see FIG. 2) which are sequentially provided on the computer screen and the responses to which are fed into the proposal and planner step 42 of the enhanced research process (FIG. 2). Most of the prompts are predetermined and selectively request information/data from the researcher.

However, the invention makes provision for the researcher to include his/her own prompts which are then displayed on the screen during subsequent use of the software. The information that is requested by the prompts is information which is expected to be of importance to the potential sponsor of the project and it should thus enable the potential sponsor to assess the viability of the project and assist the potential sponsor in making a positive decision.

Accordingly, in the embodiment depicted in the drawings, prompts are provided to answer all the conventional leadership questions 40 such as the project background 40.1, vision 40.2, objectives 40.3, beneficiaries of the project 40.4, specifications of the project output 40.5, how beneficiaries will implement the project results or output 40.6, the impact of the project on the beneficiaries 40.7 and the project output 40.9.

The software also allows the researcher to add his/her own prompts in the form of chapter headings concerning other leadership issues that the researcher or potential sponsor may regard as pertinent. The abovementioned prompts and any additional headings that the researcher adds form the "proposal" section 40 of the proposal document 24.

The software includes a direct link between the literature and reference database 34 and the proposal and planner 42. Information and the accompanying references 32 are then selectively retrieved from the literature and reference database 34 in response to one or more of the prompts regarding the leadership issues 40. The software also gives the researcher the option to search through the literature database 34 to locate specific information.

For example, the literature database 34 can be used to identify the project background 40.1, to extrapolate the potential impact 40.7 of the project on the beneficiaries or to respond to one or more of the researcher's own prompts. This allows a far more convincing proposal document 24 to be compiled for submission to the potential sponsors.

The software next prompts the researcher to answer all the management issues 44 and 46 (FIG. 2) relating to the project. These may be the basic project details 44.1 such as the project title, name and details of the research company and project leader submitting the proposal and so on. The personal details of the researcher are given automatically by the software to the prompt that requested it. These personal details are typically specified by the researcher when the software is installed and can be changed easily if needed from within the word processor or can be changed when the researcher responds to the prompt.

Further, the software prompts the researcher to give the name, address and so on of the potential sponsor. These details can be retrieved from the address database 36, previously compiled by the researcher. The address database can be accessed directly from the prompt requesting the relevant information or from the researcher's word processor.

Prompts regarding other important management issues, which the researcher may or may not respond to, include the main 46.1 and sub-planning steps 46.2, motivations 46.3 for each main step 46.1, the assumptions 44.11 upon which the planning steps are based, the contingency plans 44.12 for each assumption 44.11, the generation of a Gantt chart 44.13, the amount of external finding 44.7, all project costs (including personnel costs 44.3, operating costs 44.4, subcontractor costs 44.5 and revenue tax such as VAT 44.6) and the exact planning steps (see 46.1 and 46.2 in FIG. 2) for which these costs and/or external funding 44.7 are relevant, a financial summary 44.8 which summarises all of these costs and prompts the researcher to specify a discount (if applicable), details on the payment schedule 44.14 and amount requested from sponsor 44.9 for financing the project, project leader availability 44.2, details on project evaluators 44.10 e.g. an expert providing an opinion on the merits of the project, details on a profile of the research company 44.15 responsible for the research and details on the qualifications and curricula vitae 44.16 of persons involved in the research project.

The software contains a predetermined work plan 46 for the project which consists of the main 46.1 and detail 46-2 planning steps. This includes further prompts such as the start and end dates for each detail sub-step, the number of man days required to complete the sub-step, the position (e.g. engineer, architect, etc.) and names of the person/s conducting the sub-step and the hourly rate that the person/s are paid to conduct the sub-step. Extra information in the form of notes and/or footnotes can also be added to further explain a sub-step if necessary.

The information given for each sub-step is then compiled to give the start date, end date, number of man days and the total personnel cost for each corresponding main planning step. This is then used in the automatic generation of a Gantt chart 44.13.

The researcher is also prompted to specify at which stages of the project payment from the sponsor should be received. This will ensure that all the project costs are covered at the precise stage when these costs are incurred. This information is then in turn, used to determine the proposed payment schedule 44.14 for the project.

It is to be appreciated that the above-mentioned prompts on the leadership 40 and management prompts 44 and 46 (FIG. 2) issues of the project proposal 42 may be provided in any preselected order. For example, the prompt requesting details on who the beneficiaries 40.4 will be could follow the prompt requesting details on the proposed output of the project 40.9.

The data entered into the work plan 46 and "proposal" 40, together with that for the management issues 44 is then used by the software to generate a proposal document 24, which is transferred to a word processor for editing to render the document in a more polished or acceptable form for submission to the proposed sponsors.

The proposal document can also be edited through use of the software and then re-generated in the word processor to form an updated version, should any changes be specified by the sponsor.

The software also provides the option of generating an executive summary document 26 from the proposal document 24. Specific information from the proposal document 24 including the project details 48.1, project background 48.2, project output 48.3, beneficiaries of the project 48.5, specifications of the project output 40.5, how beneficiaries will implement the project results or output 40.6, the impact of the project on the beneficiaries 40.7, total project cost 48.6 including and excluding any discount (if applicable), the project duration and any other information from the invention's proposal and work plan that the researcher may feel pertinent can be inserted into a separate file. The executive summary 48 can then also be edited in a word processor until the executive summary document 26 is in an acceptable format to the researcher and potential sponsor.

The proposal document 24 and executive summary document 48 will then be printed and distributed to the possible sponsor/s of the project. If the executive summary 26 and proposal 24 document are approved by the sponsor, the researcher moves on to conducting the actual research work 50.

As research results, interpretations or any other pertinent work information becomes available, it is stored in a work database 52 where it is easily accessed at any stage in the research process. The tree structure of headings comprising this work database can be automatically created from the main planning steps 46.1 and sub-steps 46.2 of the work plan 46. This is shown in FIG. 3.

Figure 3:
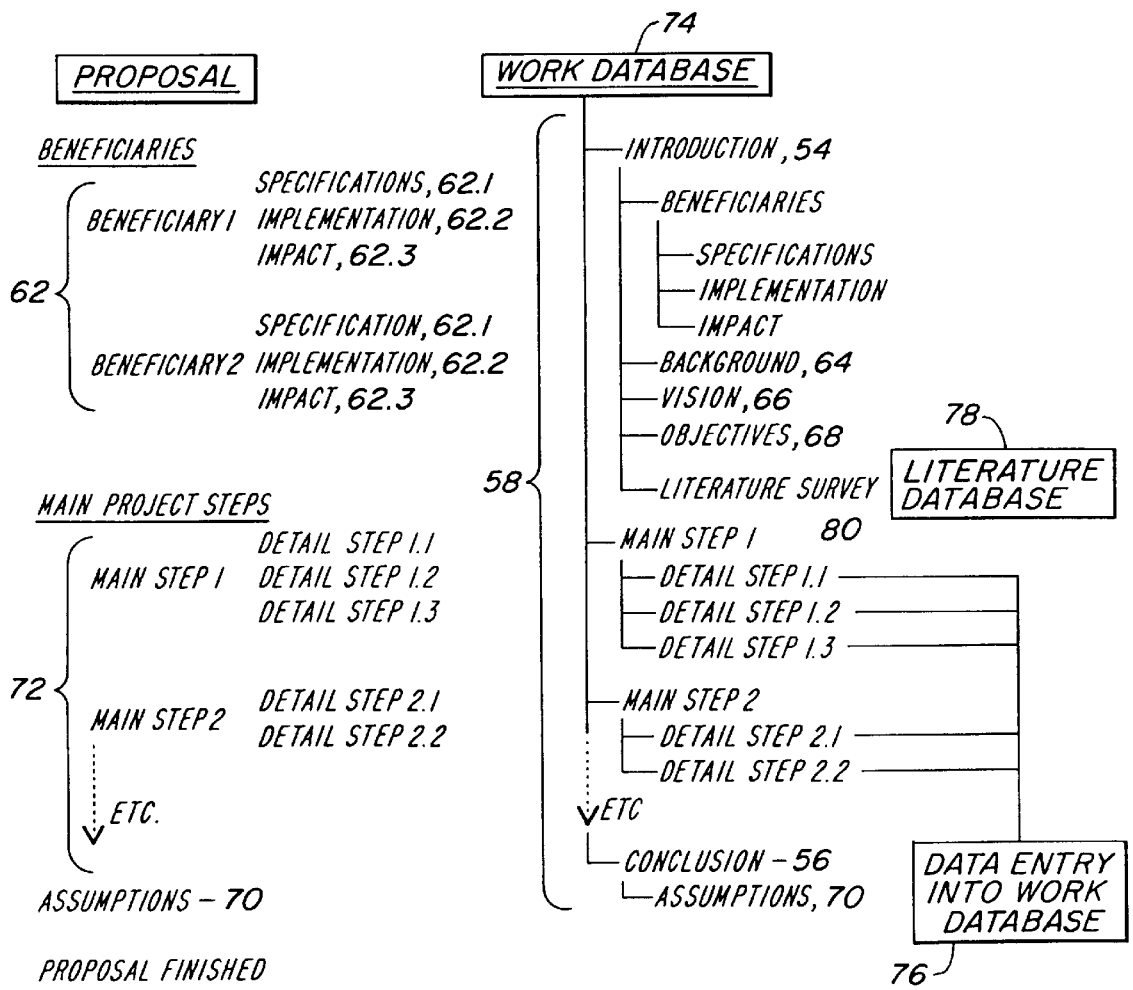
FIG. 3 is a schematic representation of a series of prompts and their arrangement in the proposal for assembling data to generate a work database.

Referring to FIG. 3, additional tree headings such as "Introduction" 54 and "Conclusion" 56 are also created to prompt the researcher that this tree structure 58 with all the information contained therein will be used later to form the report table of contents, chapter headings 52.1 (FIG. 2) and body 52.2 of the research report 60.

Leadership and other issues 40, 44 and 46 (FIG. 2) from the proposal and panner stage 42 including information regarding the beneficiaries 62 (FIG. 3), including output specifications 62.1, implementation of output or results 62.2 and potential impact of output or results 62.3), project background 64, vision 66 and objectives 68 as well as the assumptions 70 and contingency plans made for the work plan 72 are also inserted under the appropriate headings in the tree structure 58.

The researcher can move, copy, add, edit or delete any information or headings 5, in the work database 74 to suit his/her needs. As the research project progresses, the researcher adds his/her own processed research results 76, which may be in the form of text, symbols for the report nomenclature, spreadsheets, tables, pictures, graphs, equations and so on, or comments, interpretations and the like under appropriate headings in the tree structure of the work database 74.

As in the literature and reference database 34 (FIG. 2), the researcher can obtain a complete overall view of the statistics of the information stored in the invention's work database 74. In fact, the literature database has the same user interface as the work database regarding the functionality thereof.

The contents of the literature and reference database (see 78 in FIG. 3), compiled at the first stage of the process, can be copied under the automatically created heading "Literature Survey" SO or any other heading/s in the work database 74.

As in the literature and reference database 34 (FIG. 2), the work database also prompts the researcher to specify detailed reference information on each item of work information 76 (which may include additional literature information over and above that which was already stored in the literature database 78) entered into the work database 74. If the researcher is in fact merely storing his/her own research results, the software also gives the option not to link a reference to this work information 76.

Figure 4:
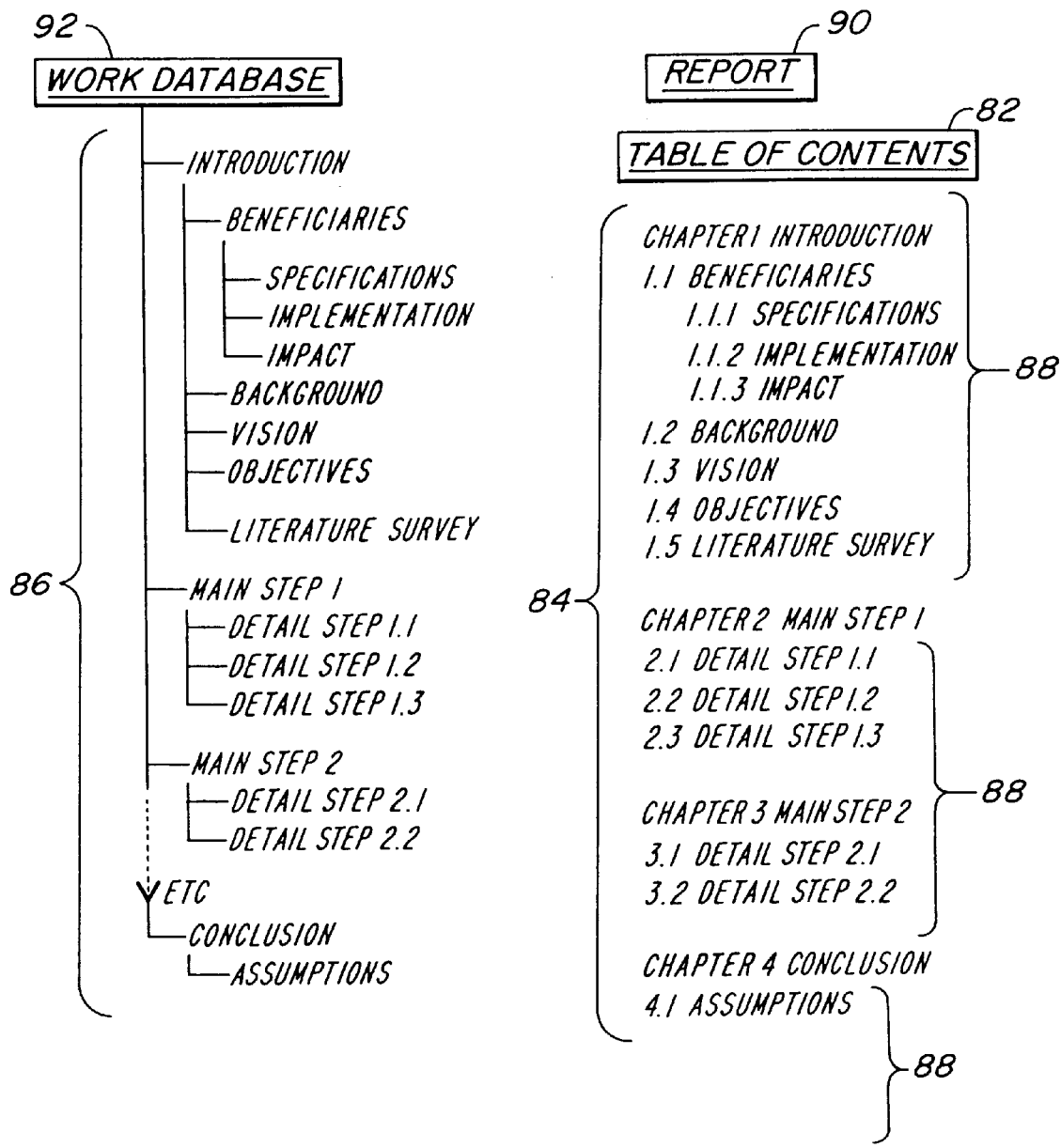
FIG. 4 is a schematic representation of a further step in the process in which once data is entered by a researcher into the work database, this data with its respective headings is used to generate the first iteration of the final research report.

As shown in FIG. 2, the researcher will only write the research report 60 (FIG. 2) once all the required information therefor is stored in the work database 52. In this regard, the term "report" is meant to include the dissertation or thesis of a postgraduate student. Referring to FIG. 4, if the researcher so chooses, the table of contents (see 60.2 in FIG. 2 or 82 in FIG. 4) and chapter headings 84 (FIG. 4) of the report are then taken directly from the work database tree headings 86 and the information stored under these headings is used to form the body 88 of the report 90.

However, the researcher is still free to specify exactly which headings are to be included in the research report 90. These chapter headings can be edited if desired and the exact items of information (stored in any database compiled by the researcher using the software during the specific project or previous research projects) to be included under each heading in the report body may be specified.

These customisation options can be carried out without having to alter the work database 92, or literature database 34 (FIG. 2) if applicable, in any way. The software also allows the researcher to search through the work database 92 (FIG. 4) to locate specific information which may be used in the report 90.

The researcher is then faced with several prompts before the first iteration of the report document is generated. The researcher may react to or ignore any of the prompts. These prompts include certain basic details regarding the project 60.1 (FIG. 2), such as project title and subtitle, authors, date of publication, name and details of sponsor, logos, etc. Some of these required details can be automatically carried over from the details 44.1 already given in the proposal document or obtained from the address database 36. The address database can be accessed directly from the prompt requesting the information or from the word processor.

Other prompts include the report nomenclature 60.3, the name of the appendices 60.4 to be included in the report document and the acknowledgements 60.5. The researcher is also able to specify the exact layout 60.6 of the generated report document.

Prior to completing the report 60, the software prompts the researcher whether a report abstract 94 (FIG. 2) is required and if so, for the information typically required in the report abstract 94 (FIG. 2). For example, if the researcher chooses, the following prompts can be given in order to assist the researcher in compiling the abstract:

what the researcher did, or aimed to achieve with the specific project;
why the researcher did what he/she did;
how the researcher did this,
what the important results of the project were; and
what the researcher's conclusions were.

The software further includes a direct link between the report abstract 94 and the final edited document 26 of the proposal executive summary 48. Information from the executive summary document 26 can then be selectively retrieved in response to one or more of the above-mentioned questions. For example, the executive summary document 26 might be used to explain why the researcher's work is important or to highlight certain unique aspects of the researcher's methodology.

The software also provides a facility whereby information from any of the researcher's work databases or literature databases (compiled using the software) can be copied to the report abstract 94. For example, information from the literature database 34 can be copied to the report abstract 94 in response to the prompt regarding why the researcher did the work.

Once all the relevant prompts have been answered by the researcher, a first iteration of the report document 28 is generated in a word processor. Once generated, the researcher may need to edit the document before it is of an acceptable format to the sponsor or study leader.

Despite this editing, the researcher will still save a considerable amount of time as i) no stored information will need to be re-typed, ii) the layout 60.6 of the document is generated exactly according to the researcher's specifications, iii) referencing of the information contained in the report is done according to acceptable international standards and iv) a complete list of references, table of contents, list of figures and tables and figure and table captions are also generated automatically. The table of contents, list of figures and tables and all captions are easily updated by using the software's enhancements of the researcher's word processor.

Any information from any of the researcher's literature databases 34 or work databases 52 compiled using the software of the invention can also be copied to the word processor, should the need arise to insert stored information after the document has been generated. References and the list of references are also automatically updated in the word processor document.

In a similar way to the process described for the report, an article or conference paper 96 can also be created. The process also allows for the final, "polished" research report document 28 to be automatically accessed. The article or conference paper 96 can then be written by simply abbreviating the report document 28 to a suitable length. Any additional changes as specified by the journal editor or conference organiser can then also easily be made.

Once the researcher is finished editing the final research document (be it a report, thesis, dissertation, article or conference paper), it can be used, through the process of the invention, to create a slide presentation 98. Selected information from the document is copied from the document into the invention's presentation writer. The copied information can be used as titles, bulleted headings, graphs, pictures, etc. on the presentation slides 100. The slides are then edited using a presentation software program. After the presentation, the project may be said to be completed—step 102 in FIG. 2.

In summary, it may be said that the process of the invention not only enhances the typical research process, but also effectively manages the entire research process. The software by means of which the invention is implemented includes a facility whereby the progress of all elements of the particular research project may easily be monitored. Files can also be copied, deleted or moved using this facility.

An extensive on-line help system also forms part of the software of the invention. This help system not only provides assistance on how the software is used but also provides detailed guidelines on how each of the software's prompts are best answered. This help system can take the form of an electronic tutor and/or detailed manual.

The invention discussed above was implemented in a computer program, called Research Toolbox Research Toolbox currently runs under Version 3.1 (and later) of Microsoft Windows (trade mark). Microsoft Office (trade mark) must also be installed.

The computer on which the software is used must be at least a '486 processor with 8 Megabytes of REM (Random Access Memory), and 30 Megabytes of hard disk space available (before installation). Research Toolbox is intended for installation on a local Personal Computer (PC) hard disk and not on a network server.

Set out below is a technical explanation of how this software works, with reference to the flowcharts of FIGS. 5 to 10.

Figure 5:
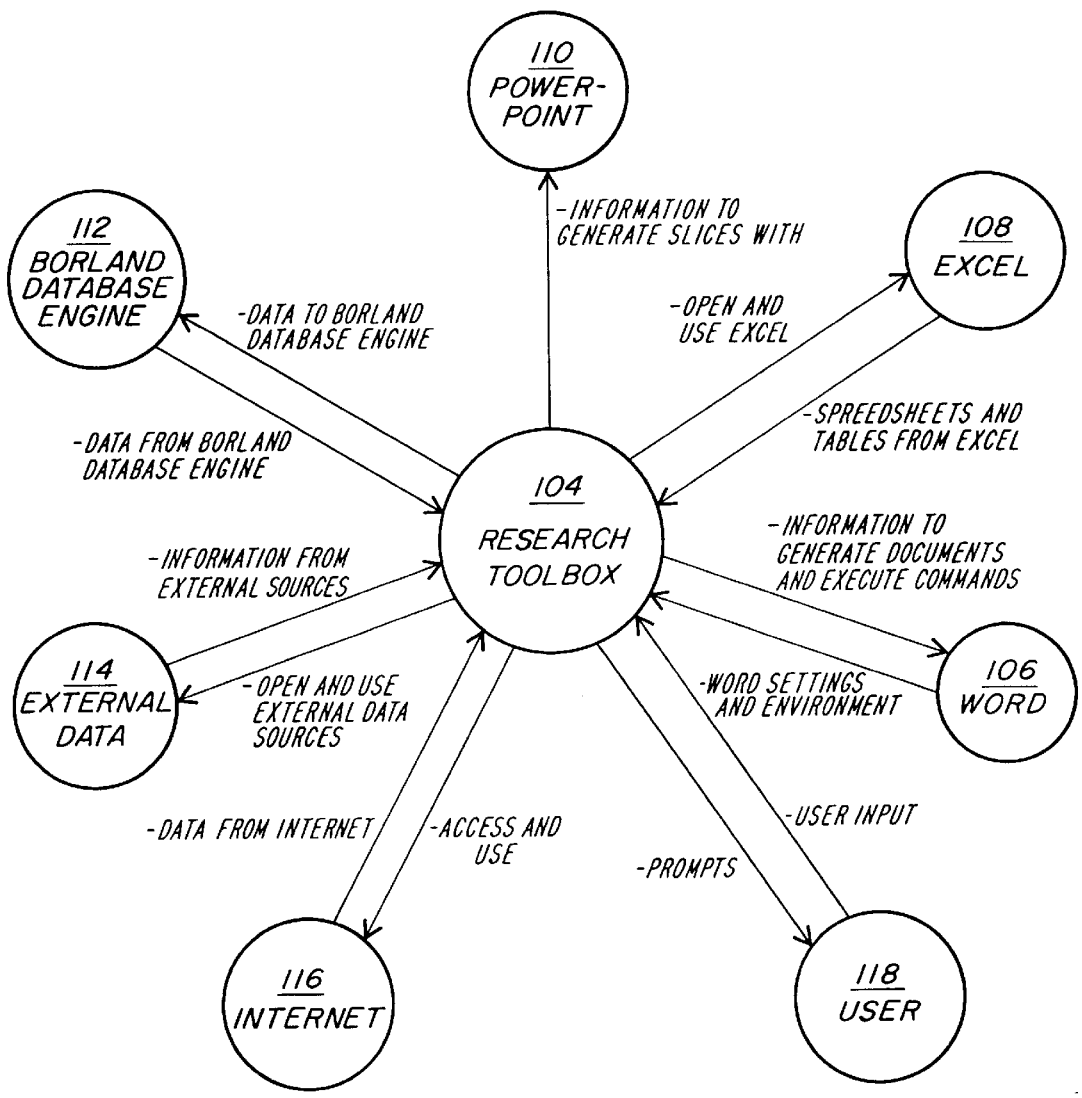
FIGS. 5 to 10 are flow charts illustrating the operation of computer software used to implement the process of the invention.

Referring first to the main flowchart shown in FIG. 5, component 104 is the software package, Research Toolbox. It consists of different types of computer files that are linked together in various ways. These files work together to lead the researcher through the research process.

The Research Toolbox software consists, inter alia, of executable modules, dynamic link libraries and Word (trade mark) macros.

Component 106 is the word processing package Word for Windows (trade mark), which is usually distributed as part of the Microsoft Office suite of programs. Research Toolbox uses the internal macro language of Word (WordBasic (trade mark) in Word 6 and Word 7 as well as Visual Basic for Applications (trade mark) in Office 97). These macros are used to execute programs and commands, to prompt the user for data, to automatically generate documents etc. Certain modules of Research Toolbox also receive data from Word.

Excel (trade mark) 108 and Powerpoint (trade mark) 110 are both part of the Microsoft Office suite of programs. Excel is a spreadsheet application while Powerpoint is used for creating presentations. Research Toolbox can open and use both these applications to create spreadsheets and tables, as well as presentation slides. Spreadsheets and tables created in Excel can also be accessed, edited and saved in Research Toolbox.

The Borland Database Engine (trade mark) 112 is used by Research Toolbox to store research information in Paradox (trade mark) tables. This engine is installed on the user's computer when installing Research Toolbox.

External data 114 refers to the information that is available to Research Toolbox. This includes many types of data files that can be stored on a computer. Examples are text files with captured data from CD-Roms, files with information scanned from books, image files generated by the user, any OLE object, etc.

The Internet 116 is accessed by Research Toolbox through a specific module. The purpose of this is the following:
  i) It helps the user to find information and Internet sites specific to research.
  ii) The Internet program also assists the user in copying information from the Internet to any of Research Toolbox's programs.

The user 118 is usually an experienced or inexperienced researcher who uses Research Toolbox to make his/her work more efficient. An inexperienced researcher will also use Research Toolbox to learn the basics of research methodology.

Figure 6:
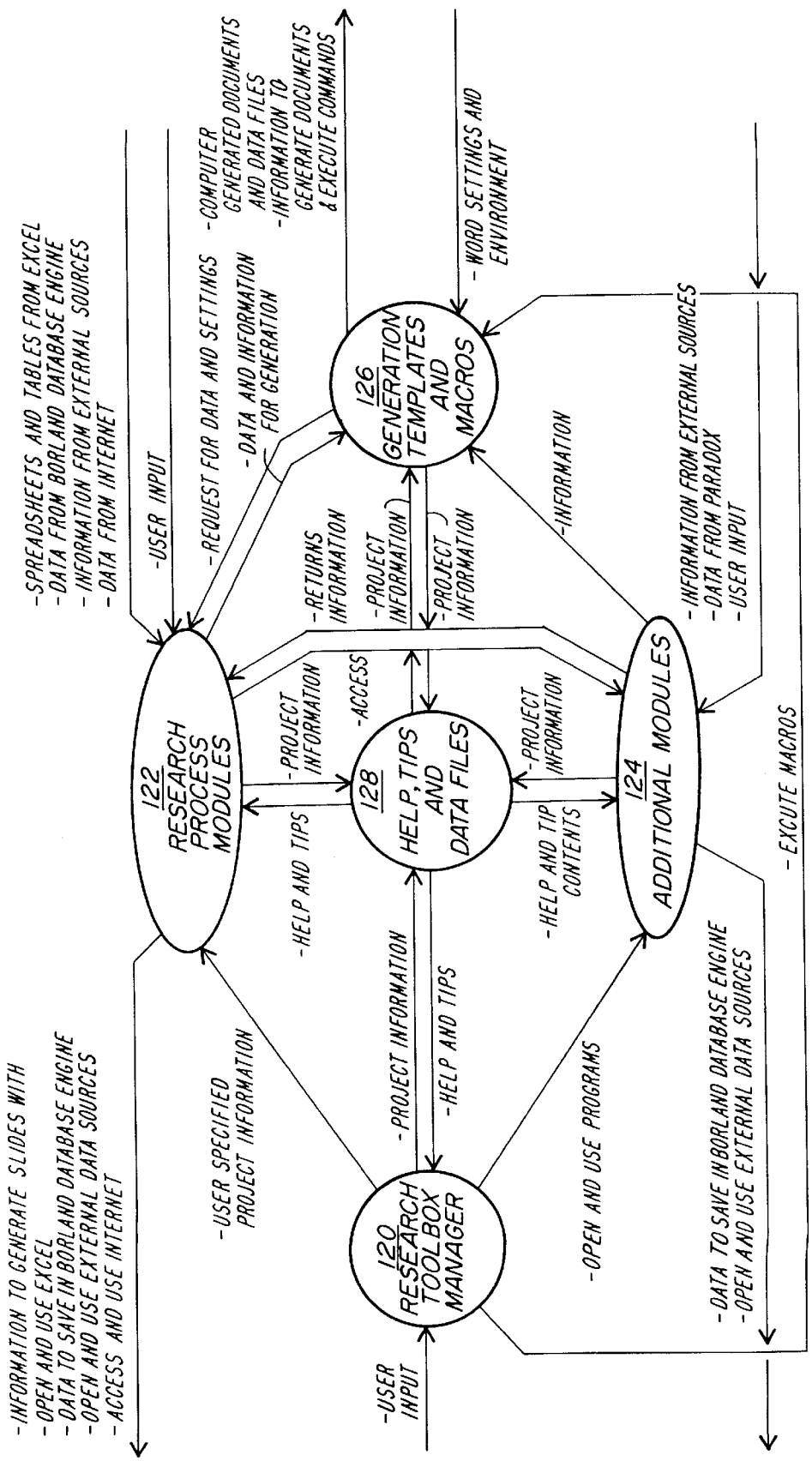

Referring now to FIG. 6, the Research Toolbox software can be divided into five distinct parts: i) The Research Toolbox manager 120, ii) modules that help the user with the research process 126, iii) additional modules 124, iv) Word macros and templates that are used to execute commands and generate documents 126, and v) Help and Tip files 128 that assist te user with the program and with research methodology. Other data files 128 are created by certain modules to share previously-entered information with other modules.

Figure 7:
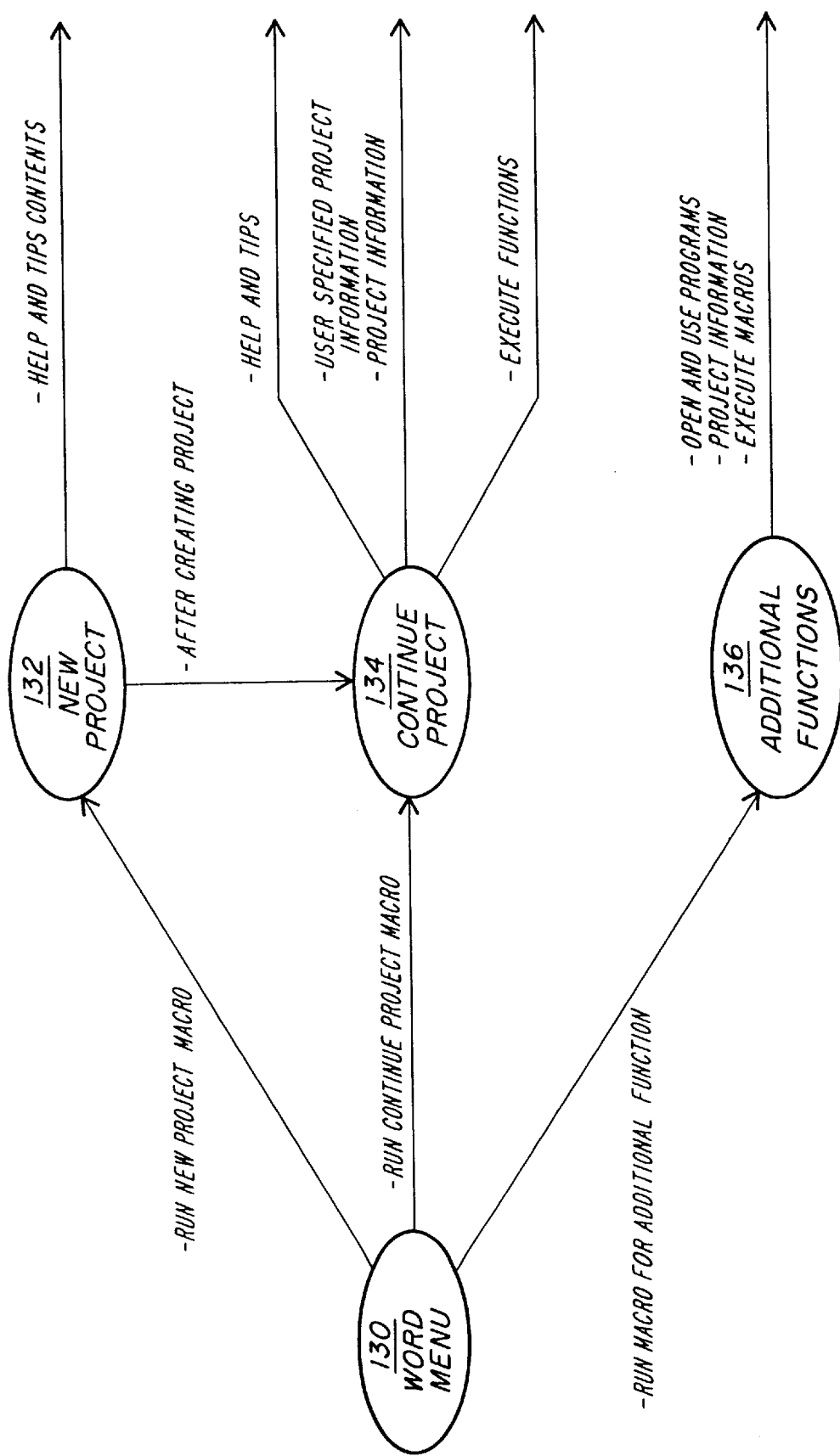

Referring now to FIGS. 6 and 7, the Research Toolbox Manager 120 consists of a number of Word macros linked to a new Research menu item 130 in Word. The Manager keeps track of a user's projects by creating a data file for each project. These files store information such as the project name, type of project (Research project, Masters project, PhD/Doctoral project), the progress of the project etc. Two menu options, Start a new project 132, or Continue with an existing project 134 are available to the user.

When starting a new project, Research Toolbox suggests the research process as the preferred way to proceed. However, the user can skip any part of the process. When continuing an existing project, the user is prompted to continue with the process component where he/she left off previously. However, the user may choose to work on any component in the research process.

Additional menu items are provided for additional functions 136. These include the following:
  i) An introduction to Research Toolbox. This demonstration gives a quick overview of how to use the program
  ii) Access the Internet Tools module.
  iii) Excel can be opened to access its statistical functions.
  iv) The database module can be run to access a Literature and Reference database file or a Work database file. Selected information from the file can be inserted into the current Word document.
  v) Tables in a Research Toolbox generated document can be updated. These tables are the Table of Contents, List of Figures, List of Tables, References etc.
  vi) User details can be edited.
  vii) The Address Database module can be accessed. Details on a selected person can be inserted into the current Word document.
  viii) The Project Filing module is used to backup or delete project files and databases.
  xi) The Research Toolbox help files as well as the on-line manual can be accessed. The manual is stored as an Adobe (trade mark) PDF file. Adobe Acrobat Reader (trade mark), used to view PDF files, is installed together with the Research Toolbox program.

Figure 8:
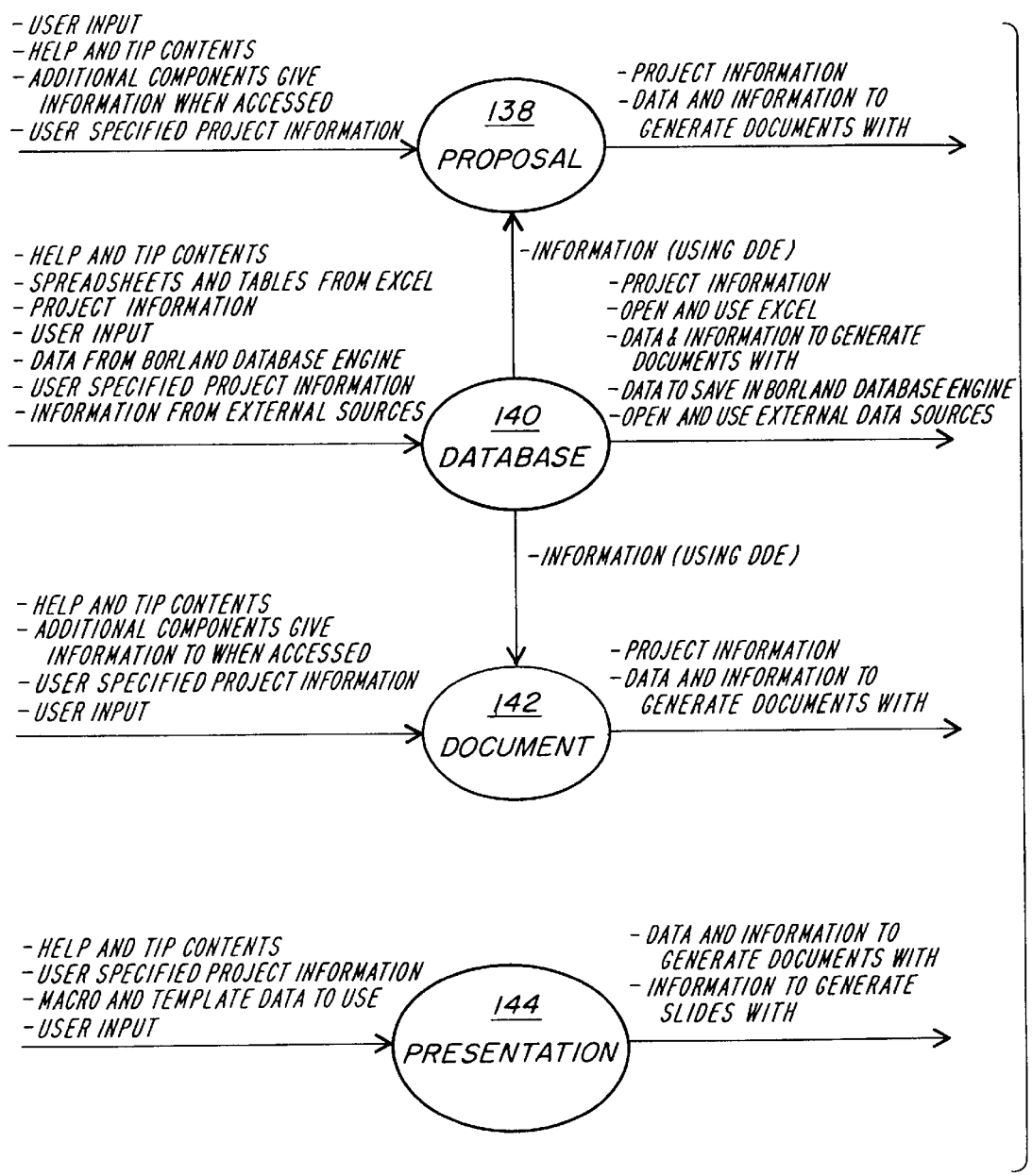
Figure 9:
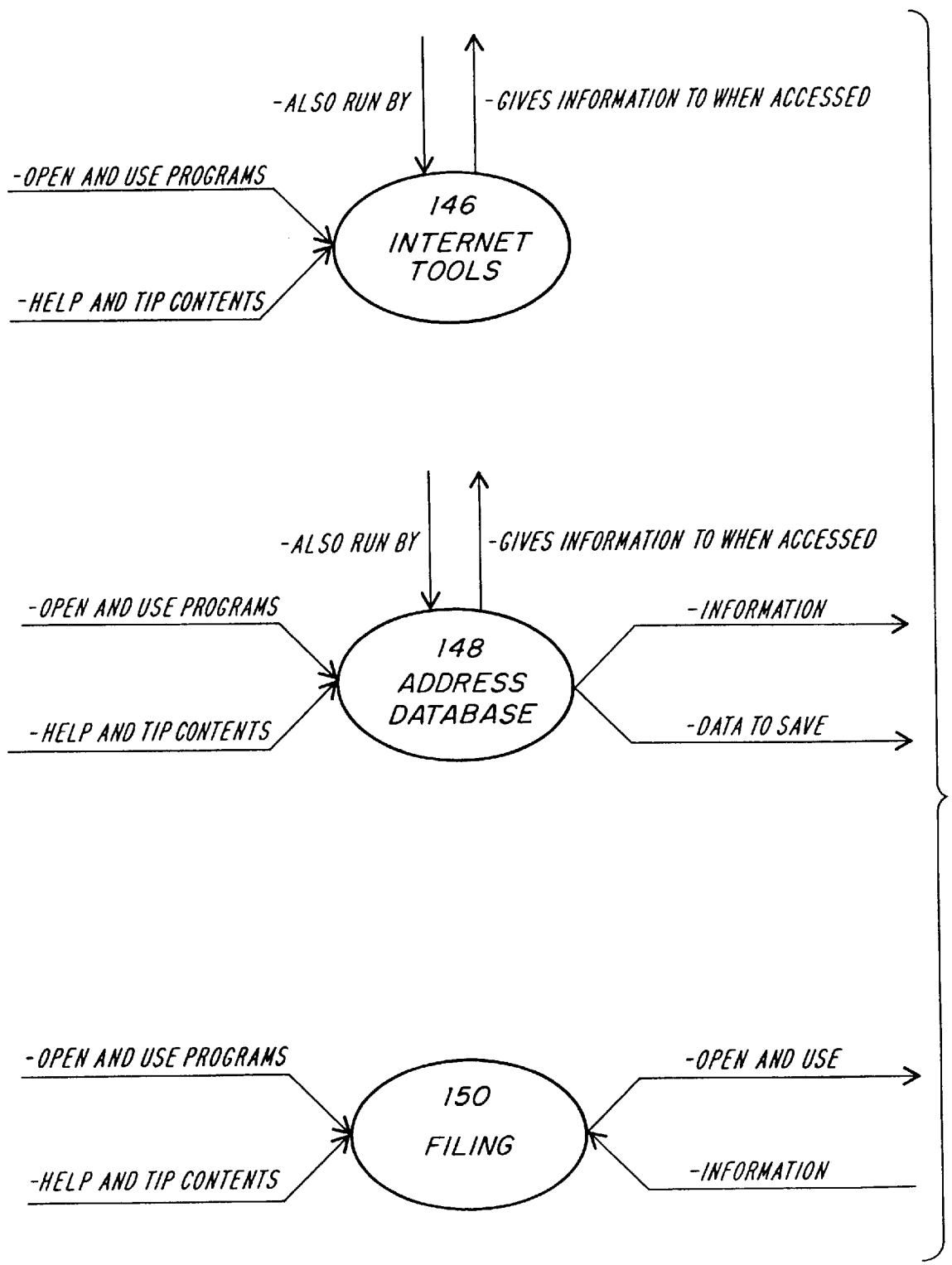
Figure 10:
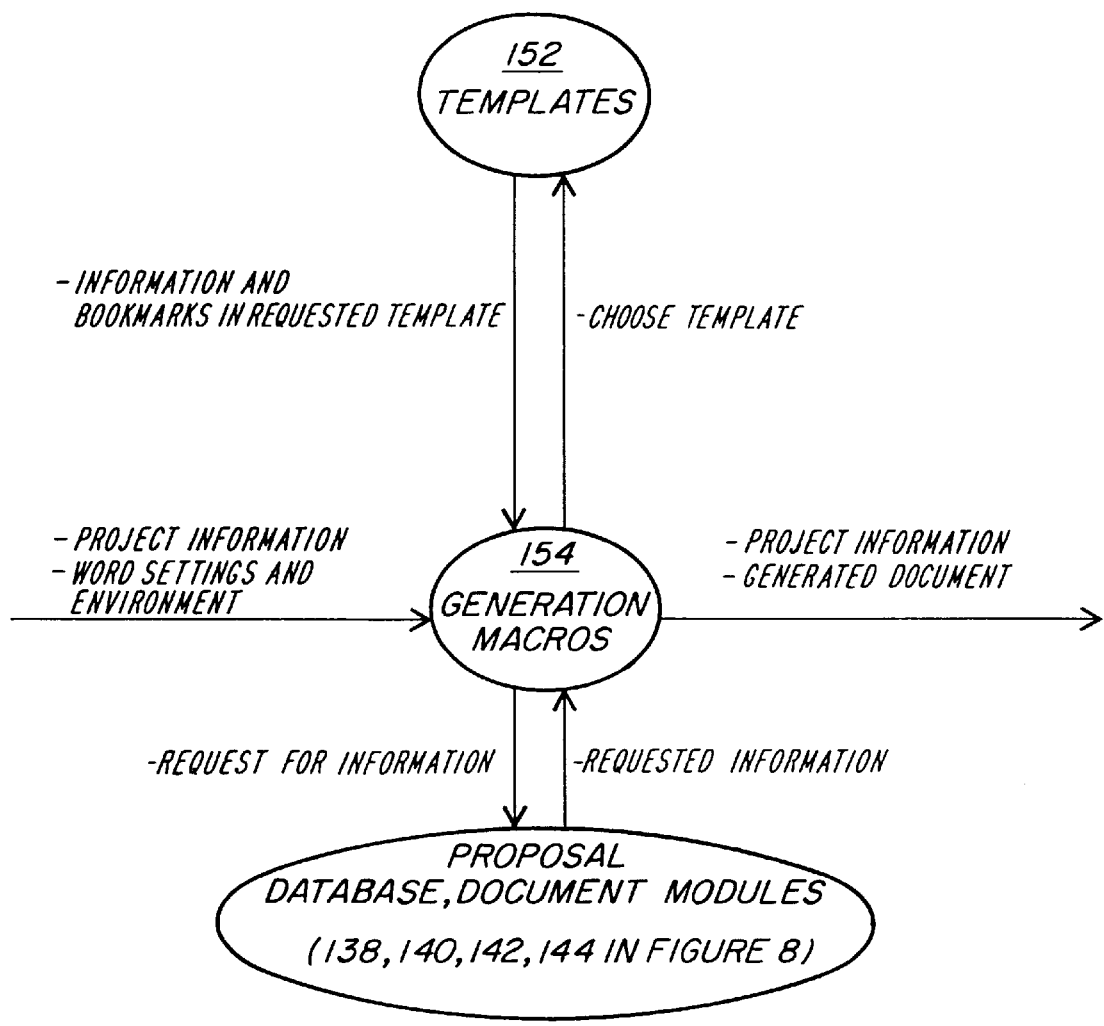

FIGS. 6 and 8 show the process modules of the software. There are four distinct process modules 122 in Research Toolbox. They are the following:
  i) The Database module 140 fulfils the role of the Literature and Reference Organiser and the Work Database.
  ii) With the Proposal 138 module the user can create a research, masters or a PhD/Doctoral proposal.
  iii) The user creates a research report, masters dissertation, a PhD/Doctoral thesis, an article and/or a conference paper with the Document nodule 142.
  iv) The Presentation module 144 can be used to create presentation slides in Powerpoint.

The Proposal module 138 consists of a series of screens that are shown to the user in a specific order. (However, the user can also access each screen directly.) On each screen, the user is prompted for information on a specific part of his/her proposal and/or work plan.

The user can supply information by typing it or selecting options with a pointing device. On certain screens, data can be copied from the Address Database (149 in FIG. 9) or Literature and Reference Organiser (Database module 140). This is done by means of Dynamic Data Exchange (abbreviated as DDE).

When the user decides to generate his/her proposal document, the information supplied in the Proposal screens is passed on to the generation macros 126. These macros then generate a proposal document using the layout selected by the user. If required, a draft copy of an Executive Summary document is also generated using the information collected by the Proposal module.

The Database module 140 fulfils the role of the first (Literature and Reference Organiser) and third (Work Database) components in the research process. Different prompts, Help and Tips are used depending on which mode the Database module is fulfilling.

The Database 140 uses a tree structure of headings to organise its data. Data is only stored under specific headings which do not have sub-headings. The Borland Database Engine is used for the actual storage of data in Paradox tables.

The Database module can store the following types of data: ASCII text, bitmap images, simple tables and any OLE objects (such as equations, graphs, spreadsheets, etc.). With some of these types, the user is allowed to import existing data from his/her hard disk.

Coupled to each item of information is a reference. A reference consists of a collection of fields describing the type of reference. Standard features such as searching, printing, editing, etc. are also included in the Database module.

In the case of starting a Work Database, the user has the option to create a new one or to build one from his/her Proposal and Work Plan. In the latter case, the main and sub-steps of the work plan are used to build the Work Database tree structure. Some information from the Proposal part is also copied into this new structure. This information is read from a data file created by the Proposal module when the proposal file was saved.

The Document module 142 is used to collect information for the creation of a research report, masters dissertation, a PhD/Doctoral thesis, an article and/or a conference paper. Information is collected using a series of screens shown in a specific order. (However, the user can also access each screen directly.) On each screen, the user is prompted for information on a specific part of his/her research report, masters dissertation, PhD/Doctoral thesis, article or conference paper.

The user can supply information by typing it or selecting options with a pointing device. On certain screens, data can be copied from the Address Database (using Dynamic Data Exchange or DDE).

To help the user write an abstract, he/she can choose to answer five predetermined questions. From this screen the user can import parts of the final Executive Summary of the Proposal. (The Executive Summary is saved as a data file by an autosave macro in the Executive Summary Word document.)

In a specific screen, the user has to compile a Table of Contents for his/her research report, masters dissertation, PhD/Doctoral thesis, article or conference paper. The user has the option of constructing the Table of Contents from the tree structure in the Work Database. This structure is passed from the Database module 140 to the Document module 142 by Dynamic Data Exchange (abbreviated as DDE). The user still has the option to edit this Table of Contents.

When the user decides to generate his/her document, the information supplied in the Document screens is passed on to the Generation macros 126. These macros then generate a research report, masters dissertation, PhD/Doctoral thesis, article or conference paper.

If the user used the tree structure from his/her Work Database as Table of Contents, the tree headings are used to create a Table of Contents at the start of the Word document. These headings are passed from the Document module to the Generation macros using Dynamic Data Exchange (abbreviated as DDE).

The same headings are also used for the headings in the body of the document. The information items under a specific heading in the Work Database, are then copied under the corresponding headings in the Word document. This works as follows:

i) The Generation macro 126 receives the Table of Contents heading from the Document module 142. Together with the actual heading, the Generation macro 126 also receives a unique number (ID) associated with each heading.

ii) When generating the document body, the Generation macro 126 passes each unique number (ID) to the Database module 140. The Database module then passes all information under the heading associated with the unique number (ID) to the Generation macro 126.

iii) The Generation macro 126 inserts these information items into the Word document under the relevant heading.

iv) All passing of information between the Generation macro 126 and the Database module 140 is done by Dynamic Data Exchange (DDE).

The Presentation module 144 is used to collect information for the creation of presentation slides in Microsoft Powerpoint. Information is collected using a series of screens. The user can supply information by typing it or selecting options with a pointing device. On all screens, data can be copied from the research report, masters dissertation, PhD/Doctoral thesis, article, conference paper or the current Word document into the Presentation module.

Text is copied into the Presentation module 144 using the following procedure:

i) The user selects text in the Word document, using his/her computer's pointing device or cursor keys.

ii) He/she clicks a button on the Presentation module 144 next to the field where he/she want to insert the selected text from Word.

iii) When the button is clicked, the Presentation module 144 runs a specific Word macro. This macro writes the text selected in the Word document to an intermediate data file.

iv) The Presentation module 144 then reads this text from the intermediate data file and displays it in the field next to the button clicked by the user.

When the user decides to generate his/her presentation slides, the following procedure is used:

i) The Presentation module 144 runs a Word macro that creates a new Word document.

ii) The Presentation module 144 then runs another Word macro that inserts the collected information into the new Word document. The standard Word heading styles are used to distinguish between slide headings and their bulleted text.

iii) This new Word document is then saved as a Rich Text Format (RTF) file.

iv) The Presentation module runs Powerpoint using the filename of the saved RTF document as command-line parameter.

v) Powerpoint automatically converts this document into slides.

Three additional modules are included in the software, namely: Internet Tools, Address Database and Project Filing. These modules are described with reference to FIGS. 6 and 9.

The Internet Tools module 146 provides information on where to find specific research information on the Internet 116. This information (Internet resources) is organised in a tree structure similar to the structure used by the Database module.

Three types of Internet resources are shown: i) Web sites, ii) Search sites and iii) Electronic Mailing lists. If the user selects a Web site or Search site, the Internet Tools module 146 opens his/her browser and accesses that site. When selecting a mailing list, an automatic e-mail subscription request is generated.

Dynamic Data Exchange (DDE) is used to point the user's browser to a selected site. Two browsers are supported, namely Netscape Navigator (trade mark) and Microsoft Internet Explorer (trade mark). The automatic e-mail subscription request is sent using standard Simple Mail Transport Protocol (SMTP).

The Address Database module 148 organises details on persons entered by the user. Persons can be listed alphabetically (according to surnames) or according to their different fields of expertise.

The Address Database module 148 is accessible from the Research Toolbox modules 138, 140 and 142 as a Dynamic Link Library (DLL). Details of the selected person (such as address, telephone numbers etc.) can be copied into the Research Toolbox module that called the Address Database 148.

From the Research menu 130 in Word 106, an executable version of the Address Database 148 can be run. Details of the selected person (such as address, telephone numbers etc.) can be copied into Word 106 using Dynamic Data Exchange (abbreviated as DDE).

The Filing module 150 is used to manage Research Toolbox (i) projects, (ii) databases and (iii) logo files.

(i) Projects:

Project names can be edited and entire projects (consisting of various module data files, intermediate data files, etc.) can be deleted. In addition, a backup can be made of a project with all its files. This backup can be restored to the same or any other computer using the Filing module 150. The intermediate data files used by Research Toolbox Manager 120 to keep track of projects and their files, are automatically updated.

(ii) Databases:

Database names can be edited and databases (consisting of various Paradox tables) can be deleted. A backup can also be made of a database and can be restored to the same or any other computer.

(iii) Logos:

Logos are used in the Proposal 138 and Document modules 142. These logos must be saved as bitmap images in a specific Research Toolbox directory. To add or remove logo files to or from this directory the Filing module 150 is used.

The Research Toolbox modules 138, 140, 142, 144, 146, 148 and 150 are run by the Research Toolbox Manager 120. When the user decides to generate a document (such as a proposal, report, article etc.), the Manager calls the Generation macros 154.

Macros refer to the programming code used in Word. (WordBasic in Word 6 and 7 as well as Visual Basic for Applications in Office 97). Templates are standard files used as a starting point for Word documents. Templates contain pre-formatted text and bookmarks indicating specific positions in the document. Research Toolbox installs templates for each type of proposal and document it generates.

The generation macros then execute the following procedure:

i) The required template 152 is opened in Word 106.

ii) The Generation macro 154 requests information items one by one from the Proposal 138, Document 142 or Database 140 module (via Dynamic Data Exchange or DDE). Information made available by the Manager 120 is also used when needed.

iii) Requested information (sent back via Dynamic Data Exchange or DDE) may be manipulated or formatted as needed by the specific proposal or document.

iv) The manipulated or formatted information is inserted into the proposal or document The insert position is defined by a bookmark or by the current cursor position.

v) More formatting is done if required.

vi) The data file storing information for the Manager about the current project is updated.

vii) The modules 138, 140, 142 and 144 are closed (via Dynamic Data Exchange or DDE) and control is passed back to the user He/she may now edit the generated proposal or document in Word 106.

In most screens used in the Research Toolbox software, the user is assisted in what he/she has to do. This help is in the form of bulleted tips at the top of these screens. These tips are read from data files each time a screen is accessed. A tip is linked to a specific screen using a unique numerical ID. In addition, different Tip files are used depending on whether the user is doing a research, Masters or PhD/Doctoral project.

Most screens in the program also has a Help button. When this button is clicked, the Research Toolbox module checks the Tip file to determine the name of the Help file as well as the Help Context ID for that screen. This Help filename and Context ID are passed to the Windows Help Engine which then shows the correct Help topic.

Data files are used to store the following information:

i) Project information (such as project type, name and description).

ii) Intermediate information passed between modules.

iii) Program settings and user details (such as name, address, telephone numbers etc.)

iv) Company Profiles and CV's used in the Proposal module.

v) Different layouts used in the report and conference (Document module)

Data are mostly implemented as Windows INI files or as plain text files. In some cases, tip files are also used as Data files (for example, user specified keywords in the Proposal module 138).

Another way of helping the user is to give fast access to Research Toolbox Help after generation of a proposal or document. A HowTo window (implemented as an executable) shows a drop-down menu of different Help topics relevant to the generated proposal or document. Selection of a topic pops up a secondary Help Window showing the corresponding Help topic. The menu items are liked to the Help topics by means of Help Context ID's in the Tip files.

The HowTo option is also implemented in the Database and Internet modules. In these modules, HowTo helps the user with data capturing and Internet usage.

In summary, the invention computerises and integrates the elements in the research process. Specific pertinent data is automatically transferred from one element in the research process to the next. This is especially relevant to the research project planning, which the method of the invention uses to form the basis of all steps in the research process that are still to follow.

The software of the invention prompts the researcher to develop a well-thought out work plan of his/her research. With this work plan, the researcher promises the sponsor what he/she will do. The software then uses this work plan as the basis of the work database tree structure. In the work database, the researcher stores all information pertaining to the work that he/she has done under the automatically generated tree structure. The automatic link between the work plan and the work database makes the process more efficient The work that the researcher does must correspond to the work he/she has promised to do in the work plan.

The researcher then uses the work database to store everything he/she has done for the project in a tree structure of headings. This may include tables of measurements, graphs and/or figures of results, comments, interpretations and the like. The software uses this work database tree structure as the basis for the final research report to be written by the researcher. The work database tree structure automatically becomes the table of contents in the report, while the work database headings with their information becomes the body of the report. The link between the work database and the report makes the process efficient as the report covers the work completed by the researcher, which was stored in the work database tree structure. This in turn was based on the work structure as promised in the work plan.

The software's literature and reference databases as well as the work database use tree structures of headings to store information. This is a better and more useful way of storing information than the generally-used sequential databases.

The software's tree structure of headings holds many other advantages for the researcher. The researcher is easily able to obtain a global view of all the information contained in the invention's literature database and/or work database (and hence the information that the report will contain). For example, headings (and hence a particular area of the researcher's work) in the tree structure with little or no information require more attention than headings containing much information.

The researcher often has to give a presentation on his/her work. It is unnecessary for the researcher to re-think the information needed for presentation slides and to re-enter the information for each slide. Everything he/she wishes to say and/or present, has already been stated and given in the research report. The invention allows the researcher to select pieces of information from the report (or thesis, dissertation, article or conference paper or the like). These selected items of information are used by the software of the invention to automatically create presentation slides.

An important part of the proposal and planning document is the executive summary. The invention makes it easy to compile this summary. Some of the information entered in the proposal and planner is automatically put together to form a first iteration of the executive summary. The researcher does not have to re-think what must be stated. He/she can edit the first iteration to quickly create a well-written executive summary.

This executive summary answers the same questions that are typically found in the abstract of a report and article. With the invention it is thus not necessary to re-think the questions and answers when writing a report, article or the like. The user can access the previously written executive summary and copy selected pieces of text into the abstract.

The software's address database stores the personal details of contacts, referees, project evaluators, suppliers and the like not only alphabetically, but also according to their expertise. It is thus easy to locate a list of people who are experts in a specific field.

Essentially the new invention integrates and automates the elements in the research process. The heart of the invention Lies in the automatic transferral of specific pertinent data from one step in the research process to the next. This is especially relevant to the research project planning, which the invention uses to form the basis of the work database. The work database is then in turn, used to obtain the basis of the final research document and/or presentation.

Through this automatic transferral of data, the typical research process can now be optimised. This may result in making experienced researchers more productive. Inexperienced researchers and students may also find the invention useful in learning the basics of research methodology by following the software's step-by-step approach.

Although the invention can be applied to any research field, it is not restricted thereto. It may also be used to assemble and process information/data of other kinds e.g. for a school project, a consulting project, or the like. Accordingly, it is to be appreciated that the term "research" is intended to include the assembly, input, manipulation, interpretation, storage and retrieval of data, and is not limited to research of an academic or scientific nature.

I claim:

1. A method of assisting the conducting of a research process which comprises a plurality of steps, the method comprising;

defining a sequence of predetermined research process steps to be used by a researcher;

in a first step, generating predetermined first prompts to guide the researcher to enter reference data corresponding to the first prompts;

storing the entered reference data in a first database having a structure which is at least partially predetermined;

in a second step, generating second prompts to guide the researcher to enter proposal data corresponding to the second prompts, and determining requirements for the retrieval of data from the first database;

Automatically retrieving selected reference data from the first database, at least partially according to requirements of the second step;

storing the selected reference data and the proposal data in a second database for use in at least one further step of the method; and generating a first report including at least a portion of the selected reference data and the proposal data.

2. A method according to claim 1 wherein the first database stores the entered reference data in a hierarchical tree structure.

3. A method according to claim 2 wherein the tree structure includes a plurality of user-defined headings.

4. A method according to claim 1 wherein the reference data comprises the results of a literature survey.

5. A method according to claim 1 wherein the first prompts include prompts for information on the source of the reference data, identification of the reference data, authors of the reference data and dates of publication of the reference data.

6. A method according to claim 1 including entering at least one user-defined first prompt.

7. A method according to claim 1 wherein the first report which is generated, including at least a portion of the selected reference data and the proposal data, is compiled as a project proposal for presentation to a sponsor.

8. A method according to claim 7 wherein the second prompts are selected from prompts for information on the project background, the project vision, the project objectives, the beneficiaries of the project, specifications of the project output, how beneficiaries will implement the project results or output, the impact of the project on the beneficiaries and the project output.

9. A method according to claim 7 wherein the second prompts are selected from prompts for information on the basic project details, the project leader, the personnel costs of the project, the operating costs of the project, the subcontractor costs of the project, tax implications of the project, funding arrangements for the project, a financial summary, the amount requested from the sponsor, details of project evaluators, assumptions on which the project planning is based, contingency plans for each assumption, the generation on a Gantt chart, a proposed payment schedule, details on a company involved in the research and curricula vitae of persons involved in the project.

10. A method according to claim 1 wherein the step of generating the second prompts comprises the step of guiding the researcher to enter work plan data corresponding to the second prompts, the work plan data being stored in the second database.

11. A method according to claim 10 wherein the entered work plan data defines the structure of the second database.

12. A method according to claim 11 wherein the second prompts are selected from prompts for information on main project planning steps, secondary project planning steps and motivation information.

13. A method according to claim 1 including, in a third step, generating third prompts to guide the researcher to enter result data corresponding to the third prompts and storing the entered result data in the second database together with data stored previously in the second database.

14. A method according to claim 13 wherein the third prompts include prompts for information on research results corresponding to headings in the second database.

15. A method according to claim 1 including, in a fourth step, generating fourth prompts to guide the researcher to select and/or enter report data corresponding to the fourth prompts for inclusion in a research report.

16. A method according to claim 15 including generating a research report comprising report data and data selected from the second database, the research report being compiled in a format which is at least partially predetermined by the structure of the second database.

17. A method according to claim 16 including generating an abbreviated article and/or conference paper and/or a presentation comprising data selected from the second database.

18. A software package for use in assisting the conducting of a research project which comprises a plurality of steps, the software comprising:

a reference database module arranged to generate predetermined first prompts to guide the researcher to enter reference data corresponding to said first prompts, and to store the entered reference data in a first database having a structure which is at least partially predetermined;

a work database module arranged to generate predetermined second prompts to guide the researcher to enter proposal data corresponding to said second prompts, to automatically retrieve selected reference data from the first database and to store the selected reference data and the proposal data in a second database for re-use; and an interface module arranged to extract selected data from the second database and to generate a first report comprising the selected data and the proposal data, so that the first report has a format which is at least partially determined by the structure of the second database.

19. A software package according to claim 18 wherein the work database module includes a proposal sub-module for generating prompts to guide the researcher to enter proposal data, and a planning sub-module for generating prompts to guide the researcher to enter planning data.

20. A software package according to claim 19 wherein the work database module operates to define the structure of the second database partially from the structure of the first database and partly from the entered planning data.

21. A software package according to claim 18 wherein the work database module is arranged to generate predetermined third prompts to guide the researcher to enter result data corresponding to said third prompts and to store the entered result data in the second database together with data stored previously in the second database.

22. A software package according to claim 21 wherein the work database module is arranged to generate fourth prompts to guide the researcher to select and/or enter report data corresponding to said fourth prompts for inclusion in a research report and to generate, via the interface module, a research report comprising report data and data selected from the second database, so that the research report has a format which is at least partially predetermined by the structure of the second database.

* * * * *